United States Patent
Fayolle et al.

(10) Patent No.: US 11,211,622 B2
(45) Date of Patent: Dec. 28, 2021

(54) FUEL CELL SYSTEM

(71) Applicant: Panasonic Intellectual Property Management Co., Ltd., Osaka (JP)

(72) Inventors: Marine Fayolle, Osaka (JP); Satoru Tamura, Chiba (JP); Yosuke Kitazawa, Osaka (JP); Takao Hayashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 398 days.

(21) Appl. No.: 16/426,658

(22) Filed: May 30, 2019

(65) Prior Publication Data

US 2019/0379073 A1 Dec. 12, 2019

(30) Foreign Application Priority Data

Jun. 12, 2018 (JP) .............................. JP2018-111805

(51) Int. Cl.
*H01M 8/04701* (2016.01)
*H01M 8/04007* (2016.01)
*H01M 8/18* (2006.01)

(52) U.S. Cl.
CPC ... *H01M 8/04731* (2013.01); *H01M 8/04074* (2013.01); *H01M 8/04708* (2013.01); *H01M 8/04716* (2013.01); *H01M 8/188* (2013.01)

(58) Field of Classification Search
CPC ... H01M 8/04–04014; H01M 8/04067–04074; H01M 8/04694–04716; H01M 8/04731; H01M 8/18–184; H01M 8/188
See application file for complete search history.

(56) References Cited

U.S. PATENT DOCUMENTS 3,271,197 A * 9/1966 Lyons, Jr. ............... H01M 8/18
429/419
5,250,158 A * 10/1993 Kaneko ................. H01M 8/188
205/538

(Continued)

FOREIGN PATENT DOCUMENTS

| GB | 2513413 A | * 10/2014 | ............ H01M 8/188 |
| JP | 2017-500692 | 1/2017 | |
| WO | WO-2014174295 A1 | * 10/2014 | ........ H01M 8/04029 |

*Primary Examiner* — Jonathan Crepeau
*Assistant Examiner* — Jacob Buchanan
(74) *Attorney, Agent, or Firm* — McDermott Will and Emery LLP (57) ABSTRACT

A fuel cell system includes: a fuel cell that includes an anode and a cathode and generates electricity by reducing a mediator at the cathode; a regenerator that oxidizes the mediator reduced by the cathode; a first path that leads from the cathode to the regenerator and through which the mediator reduced by and discharged from the cathode is guided to the regenerator; a second path that leads from the regenerator to the cathode and through which the mediator oxidized at the regenerator is returned to the cathode; and a first heat exchanger that exchanges heat between a first fluid and a second fluid, the first fluid being a fluid flowing in the first path and containing the mediator reduced by cathode, and the second fluid being a fluid flowing in the second path and containing the mediator oxidized at the regenerator.

10 Claims, 4 Drawing Sheets

(56) References Cited

U.S. PATENT DOCUMENTS

| | | | | |
|---|---|---|---|---|
| 6,048,383 A * | 4/2000 | Breault | .............. | H01M 8/04119 95/44 |
| 2008/0187789 A1 * | 8/2008 | Ghezel-Ayagh | ............................ | H01M 8/04014 429/414 |
| 2010/0291429 A1 * | 11/2010 | Farmer | .................. | B60L 50/64 429/120 |
| 2012/0107702 A1 * | 5/2012 | Creeth | .............. | H01M 8/04276 429/409 |
| 2016/0301094 A1 | 10/2016 | Longman | | |

\* cited by examiner

FUEL CELL SYSTEM

BACKGROUND

1. Technical Field

The present disclosure relates to a fuel cell system.

2. Description of the Related Art

A fuel cell system that uses a catholyte containing a redox couple is known.

For example, Japanese Unexamined Patent Application Publication (Translation of PCT Application) No. 2017-500692 describes a fuel cell assembly that includes a fuel cell stack and a regeneration section. The fuel cell stack includes membrane electrode assemblies each of which includes an anode and a cathode. The catholyte containing a redox couple is supplied to the fuel cell stack, comes into flowing contact with the cathode of the membrane electrode assemblies, and then is supplied to the regeneration section. To the regeneration section, an oxidant is supplied by a supply device. The redox couple in the catholyte is reduced by reaction at the cathode. After the reaction at the cathode, the catholyte passes away from the cathode and onto the regeneration section. The oxidant supplied to the regeneration section oxidizes the redox couple in the catholyte, at least partially.

SUMMARY

The technology described in Japanese Unexamined Patent Application Publication (Translation of PCT Application) No. 2017-500692 has room for improvement in terms of the service life of the fuel cell. One non-limiting and exemplary embodiment therefore provides a fuel cell system advantageous in extending the service life of a fuel cell.

In one general aspect, the techniques disclosed here feature a fuel cell system. The fuel cell system includes: a fuel cell that includes an anode and a cathode and generates electricity by reducing a mediator at the cathode; a regenerator that oxidizes the mediator reduced by the cathode; a first path that leads from the cathode to the regenerator and through which the mediator reduced by and discharged from the cathode is guided to the regenerator; a second path that leads from the regenerator to the cathode and through which the mediator oxidized at the regenerator is returned to the cathode; and a first heat exchanger that exchanges heat between a first fluid and a second fluid, the first fluid being a fluid flowing in the first path and containing the mediator reduced by cathode, and the second fluid being a fluid flowing in the second path and containing the mediator oxidized at the regenerator.

This fuel cell system is advantageous in extending the service life of a fuel cell.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

Fuel cells, such as solid-polymer fuel cells, are not very efficient in reactions for power generation primarily because the cathodic reduction of oxygen proceeds slowly. A potential solution to this is to supply a solution containing a readily reducible mediator to the cathode of the fuel cell. This eliminates the need for the use of platinum in making the cathode.

The mediator reduced at the cathode is regenerated through oxidation by an oxidant and then can be recycled to the cathode. As a result, the mediator can be reduced and regenerated repeatedly. The oxidation of the mediator, however, is exothermic, and the heat produced tends to cause the solution containing the oxidized mediator, flowing toward the cathode, to be hot. A fuel cell usually incorporates a polymer electrolyte membrane or similar component, and the inventors have found that allowing such a hot mediator-containing solution to be supplied to the cathode often causes thermal degradation of the polymer electrolyte membrane or similar component and thereby prevents extended use of the fuel cell. After extensive research on how to combine the use of a mediator with an extended service life of a fuel cell, the inventors conceived an idea about the path for guiding the oxidized mediator to the cathode. The fuel cell system according to the present disclosure is based on this idea.

Overview of Aspects of the Disclosure

A fuel cell system includes: a fuel cell that includes an anode and a cathode and generates electricity by reducing a mediator at the cathode; a regenerator that oxidizes the mediator reduced by the cathode; a first path that leads from the cathode to the regenerator and through which the mediator reduced by and discharged from the cathode is guided to the regenerator; a second path that leads from the regenerator to the cathode and through which the mediator oxidized at the regenerator is returned to the cathode; and a first heat exchanger that exchanges heat between a first fluid and a second fluid, the first fluid being a fluid flowing in the first path and containing the mediator reduced by cathode, and the second fluid being a fluid flowing in the second path and containing the mediator oxidized at the regenerator.

The first aspect includes a second path through which the mediator oxidized at the regenerator is returned to the cathode. The mediator is therefore supplied at a lowered temperature to the cathode, preventing the associated degradation of components of the fuel cell. This helps extend the service life of the fuel cell in the fuel cell system.

Specifically, the second fluid, flowing in the second path and containing the mediator, is hotter than the first fluid, flowing in the first path and containing the mediator, because of the heat produced with the oxidation of the mediator at the regenerator. The heat exchange between the first and second fluids at the first heat exchanger therefore cools the second fluid. The mediator supplied to the cathode is cooled, helping extend the service life of the fuel cell. The first fluid, moreover, is heated by the heat exchange between the first and second fluids at the first heat exchanger, helping the mediator to be supplied at an increased temperature to the regenerator. This helps maintain the internal temperature of the regenerator at a desired temperature, thereby accelerating the oxidation of the mediator.

In a second aspect of the present disclosure, for example, the second path in the fuel cell system according to the first aspect releases more heat per second than the first path does. In the second aspect, much heat released from the second path helps cool the mediator in the second path appropriately. The mediator supplied to the cathode is cooled in a more reliable manner, helping extend the service life of the fuel cell. Moreover, little heat released from the first path prevents the mediator supplied to the regenerator from cooling easily. This helps maintain the internal temperature of the regenerator at a desired temperature, thereby accelerating the oxidation of the mediator.

In a third aspect of the present disclosure, for example, at least part of the second path in the fuel cell system according to the first or second aspect is made of a material having a higher thermal conductivity than the material forming the first path. In the third aspect, the heat of the mediator in the second path easily goes out of the second path, helping the mediator in the second path to be cooled. The mediator to be supplied to the cathode is therefore cooled in a more reliable manner, helping extend the service life of the fuel cell.

In a fourth aspect of the present disclosure, for example, the fuel cell system according to any one of the first to third aspects further includes a thermal insulator that covers at least part of the first path. In the fourth aspect, the thermal insulator prevents the mediator from cooling in the first path. This helps maintain the internal temperature of the regenerator at a desired temperature, thereby accelerating the oxidation of the mediator.

In a fifth aspect of the present disclosure, for example, the fuel cell system according to any one of the first to fourth aspects further includes an oxidant feed path through which an oxidant is supplied to the regenerator; and a second heat exchanger that exchanges heat between the oxidant in the oxidant feed path and the second fluid, flowing in the second path and containing the mediator. In many cases, the oxidant (e.g., air) supplied to the regenerator through the oxidant feed path is colder than the second fluid, flowing in the second path and containing the mediator. The heat exchange between the oxidant and the second fluid at the second heat exchanger therefore cools the second fluid. The mediator supplied to the cathode is cooled, helping extend the service life of the fuel cell. The oxidant, moreover, is heated by the heat exchange between the oxidant and the second fluid at the second heat exchanger, ensuring the oxidant is supplied at an increased temperature to the regenerator. This helps maintain the internal temperature of the regenerator at a desired temperature, thereby accelerating the oxidation of the mediator.

In a sixth aspect of the present disclosure, for example, the fuel cell system according to the first to fifth aspects further includes a tank that is disposed in the second path and retains the mediator oxidized at the regenerator. In the sixth aspect, it is easier to make the regenerator smaller in size because the tank takes charge of retaining the mediator oxidized at the regenerator. The use of a smaller regenerator reduces the external supply of energy required to maintain the inside of the regenerator at a desired temperature, thereby making the fuel cell system more efficient.

In a seventh aspect of the present disclosure, for example, the fuel cell system according to the sixth aspect further includes a liquid delivery path that is connected to the tank and through which a liquid for diluting the mediator is supplied to the tank; and a controller that regulates the flow rate of the liquid in the liquid delivery path. In the seventh aspect, the concentration of the mediator can be controlled to a desired range because the mediator can be diluted with the liquid supplied through the liquid delivery path to the tank as necessary. The temperature of the mediator in the tank can also be controlled to a desired range.

In an eighth aspect of the present disclosure, for example, the second path in the fuel cell system according to the seventh aspect includes an upstream path that connects the regenerator and the tank; the upstream path has a first portion that extends from the regenerator to the tank and a second portion that allows the mediator to cool down while bypassing at least part of the first portion; and the controller regulates the flow rate of the mediator in the first portion and the flow rate of the mediator in the second portion. In the eighth aspect, the temperature of the mediator supplied to the tank can be controlled by adjusting the flow rate of the mediator in the first portion and that in the second portion.

In a ninth aspect of the present disclosure, for example, the fuel cell system according to any one of the first to eighth aspects further includes a thermal insulator that covers at least part of the regenerator. In the ninth aspect, the thermal insulator helps maintain the inside of the regenerator at a desired temperature. The insulator also reduces the external supply of energy required to maintain the inside of the regenerator at a desired temperature, thereby helping improve the efficiency of the fuel cell system.

In a tenth aspect of the present disclosure, for example, the fuel cell system according to any one of the first to ninth aspects further includes a heater that heats the inside of the regenerator. In the tenth aspect, the inside of the regenerator can be maintained at a desired temperature by turning on the heater as necessary.

Embodiments

The following describes embodiments of the present disclosure with reference to drawings. It should be noted that the following embodiments are merely for illustrative purposes, and fuel cell systems according to the present disclosure are not limited to these embodiments.

Figure 1:
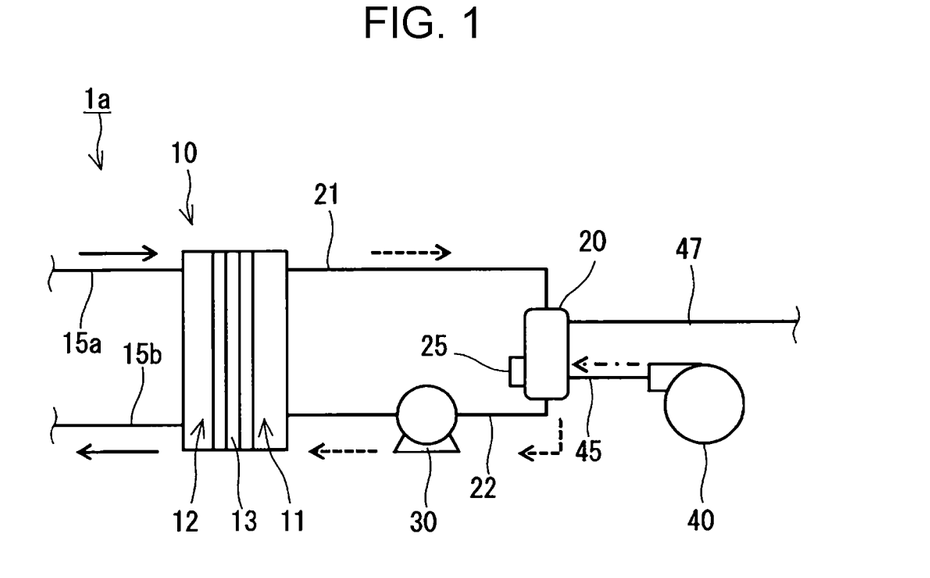
FIG. 1 illustrates an example of a fuel cell system according to the present disclosure.

As illustrated in FIG. 1, a fuel cell system 1a includes a fuel cell 10, a regenerator 20, a first path 21, and a second path 22. The fuel cell 10 has a cathode 11 and an anode 12 and generates electricity by reducing a mediator at the cathode 11. The regenerator 20 oxidizes the mediator reduced by the cathode 11. The first path 21 leads from the cathode 11 to the regenerator 20, and through this first path 21 the mediator discharged from the cathode 11 is guided to the regenerator 20. The second path 22 leads from the regenerator 20 to the cathode 11, and through this second path 22 the mediator oxidized at the regenerator 20 is returned to the cathode 11 while cooling down.

In the fuel cell system 1a, any kind of fuel and any kind of oxidant for regenerating the mediator can be used. For example, the fuel cell system 1a operates with hydrogen as the fuel and air as the oxidant. In FIG. 1, the solid-line arrows represent the flow of the fuel, the broken-line arrows represent the flow of the mediator, and the arrow with a dash dot line represents the flow of the oxidant.

The fuel cell 10 is, for example, a solid-polymer fuel cell. The cathode 11 can be made of a known material for the cathode of a solid-polymer fuel cell. Although the cathode of ordinary solid-polymer fuel cells contains platinum, the material for the cathode 11 does not need to contain it because the mediator is more reducible at the cathode 11 than oxygen, and this eliminates the need for a catalyst for activating the oxidant. The anode 12 can be made of a known material for the anode of a solid-polymer fuel cell. Typically, the fuel cell 10 further includes an electrolyte membrane 13. The electrolyte membrane 13 is between the cathode 11 and the anode 12 and conducts protons. The cathode 11 and the anode 12 are separated by the electrolyte membrane 13. The electrolyte membrane 13 can be made of a known material for the electrolyte of a solid-polymer fuel cell, such as Nafion®.

While the fuel cell 10 is operating, the anode 12 is supplied with, for example, fuel gas containing hydrogen gas. At the anode 12, the hydrogen is separated into protons $H^+$ and electrons $e^-$. The protons then move to the cathode 11 through the electrolyte membrane 13, whereas the electrons $e^-$ move to the cathode 11 via an external circuit (not illustrated). The cathode 11 is supplied with, for example, a mediator-containing solution while the fuel cell 10 is operating. In this solution, the mediator is in its oxidized state $Med_{ox}$. The oxidized mediator $Med_{ox}$ is reduced at the cathode 11, turning into a reduced mediator $Med_{red}$, and leaves the fuel cell 10. The solution containing the reduced mediator $Med_{red}$ is supplied to the regenerator 20 through the first path 21. At the regenerator 20, the reduced mediator $Med_{red}$ is oxidized by oxygen, the active ingredient of the oxidant, turning into the oxidized form $Med_{ox}$ of the mediator. This is the regeneration of the mediator. The mediator regenerated at the regenerator 20 is supplied to the cathode 11 through the second path 22.

The oxidation of the reduced mediator $Med_{red}$ is typically exothermic. The inside of the regenerator 20 therefore tends to be hot (e.g., 100° C.). This means, if the solution containing the mediator regenerated at the regenerator 20 were supplied to the cathode 11 while keeping its temperature, the electrolyte membrane 13 or similar component of the fuel cell 10 would degrade easily. In the fuel cell system 1a, however, the second path 22 guides the mediator oxidized at the regenerator 20 to the cathode 11 while cooling it down. The mediator-containing solution supplied to the cathode 11 is cooled to a predetermined temperature (e.g., 80° C. or less), thereby preventing the degradation of components of the fuel cell 10. In the fuel cell system 1a, therefore, the fuel cell 10 tends to have an extended service life. The fuel cell 10 can even be cooled using the mediator-containing solution.

In the fuel cell system 1a, for example, the second path 22 releases more heat per second than the first path 21 does. The resulting more appropriate cooling of the second path 22 helps the mediator-containing solution to be supplied at an appropriate temperature to the cathode 11, thereby helping extend the service life of the fuel cell 10. To accelerate the oxidation of the mediator at the regenerator 20, it is advantageous that the inside of the regenerator 20 be hot. While the fuel cell system 1a is operating normally, little heat released from the first path 21 prevents the mediator-containing solution supplied to the regenerator 20 from cooling easily. This helps maintain the internal temperature of the regenerator 20 at a desired temperature, thereby helping accelerate the oxidation of the mediator at the regenerator 20. In an exemplary configuration, the second path 22 releases more heat per second than the first path 21 does during the normal operation of the fuel cell system 1a. The normal operation of the fuel cell system 1a is to continue generating a predetermined output power (e.g., 100 W or more) for a predetermined period of time.

In the fuel cell system 1a, for example, at least part of the second path 22 is made of a material that has a higher thermal conductivity than the material forming the first path 21. This helps the heat of the mediator-containing solution in the second path 22 go out of the second path 22, thereby helping the mediator-containing solution to be cooled in the second path 22. The mediator to be supplied to the cathode 11 is therefore cooled in a more reliable manner, helping extend the service life of the fuel cell 10. The thermal conductivity of the material for the tubing defining the first path 21 and that of the material for the tubing defining the second path 22 are, for example, values at 25° C.

In the fuel cell system 1a, for example, the second path 22 is longer than the first path 21. This helps increase the release of heat from the mediator-containing solution in the second path 22, thereby helping the mediator-containing solution to be cooled appropriately in the second path 22. In an exemplary configuration, the tubing defining the second path 22 has a greater surface area than that defining the first path 21. This also helps increase the release of heat from the mediator-containing solution in the second path 22. The tubing defining the second path 22 may be made of a metallic material. The tubing defining the second path 22 may be fitted with a fin. At least part of the tubing defining the second path 22 may be in contact with a space through which air can pass. For example, the fuel cell system 1a may include an enclosure (not illustrated) having an air inlet and an air outlet, and at least part of the tubing defining the second path 22 may be in contact with the air passage extending from the air inlet to the air outlet of this enclosure. The fuel cell system 1a may further include, for example, a fan or blower (not illustrated). In an exemplary configuration, the fan or blower operates to produce a stream of air that passes across at least part of the tubing defining the second path 22.

Any kind of mediator can be used as long as it is more reducible than oxygen gas and can be reduced and oxidized repeatedly. To name a few, the mediator can be a polyoxometalate, metal ions, or a metal complex. Polyoxometalates that can be used include phosphomolybdic acid, phosphovanadic acid, and phosphotungstic acid, and metals polyoxometalates can have include vanadium, molybdenum, and tungsten. Examples of metal complexes include porphyrin metal complexes, TEMPO (2,2,6,6-tetramethylpiperidine 1-oxyl)-coordinated metal complexes, and metal complexes coordinated by an oxidase or its derivative. The oxidase can be, to name a few, galactose oxidase, bilirubin oxidase, or glucose oxidase.

The mediator typically circulates between the cathode 11 and the regenerator 20 in solution form. The higher the mediator concentration of the solution is, the faster the mediator is reduced at the cathode 11. It is therefore advantageous that the mediator be highly soluble in a predetermined solvent, such as water, at the temperature at which it is used. The mediator solution may contain multiple mediators. The solvent, too, can be of any kind. An example of a solvent in the mediator solution is water, and the mediator solution may contain an acid component, such as sulfuric acid or phosphoric acid. The pH of the mediator solution may be acidic. The mediator solution may contain an appropriate electrolyte.

As illustrated in FIG. 1, the fuel cell system 1a further includes, for example, a pump 30. The pump 30 operates to guide the mediator-containing solution to the regenerator 20 through the first path 21 and to return the mediator-containing solution to the cathode 11 through the second path 22. The pump 30 is located, for example, in the second path 22. The pump 30 may be in the first path 21. The pump 30 is, for example, a displacement pump, such as a piston pump, a plunger pump, a gear pump, or a vane pump. There may be a regulator in the first or second path 21 or 22 for controlling the flow rate of the mediator.

The fuel cell system 1a further includes, for example, a delivery route 15a and a recovery route 15b. Each of the delivery and recovery routes 15a and 15b is connected to the anode 12. Through the delivery route 15a hydrogen-containing fuel is supplied to the anode 12, and unreacted fuel is recovered from the fuel cell 10 through the recovery route 15b.

The fuel cell system 1a further includes, for example, an oxidant feed path 45. The oxidant feed path 45 guides an oxidant to the regenerator 20. The fuel cell system 1a further includes, for example, a blower 40, and air sent out from the blower 40 is supplied to the regenerator 20 through the oxidant feed path 45. In an exemplary configuration, the blower 40 operates to take in external air and send it out to the oxidant feed path 45.

The regenerator 20 is not limited to a particular form as long as it allows a solution containing the reduced mediator to come into contact with the oxidant. The regenerator 20 may be a bath reactor or may be a column reactor. In an exemplary configuration, the regenerator 20 retains a solution containing the mediator. In this case the air that has passed through the oxidant feed path 45 is, for example, blown into the mediator-containing solution retained in the regenerator 20. The mediator solution may be in jet stream or tiny droplet (mist) form. The air in this case is, for example, blown out from the exit of the oxidant feed path 45 toward the jet stream or tiny droplets of the mediator solution. This allows the mediator solution to meet the gas present inside the regenerator 20 with a larger interface, thereby helping accelerate the oxidation of the mediator.

The fuel cell system 1a further includes, for example, a gas discharge path 47. At the regenerator 20, water is produced with the oxidation of the mediator. Since, as mentioned above, the inside of the regenerator 20 can be maintained at a relatively high temperature, part of the produced water evaporates into steam. The steam in the regenerator 20 is discharged from the regenerator 20 and flows through the gas discharge path 47. This prevents the mediator solution inside the regenerator 20 from being deficient in the mediator, thereby preventing the associated decrease in the efficiency of the fuel cell 10 in power generation. The gas discharge path 47 may also be used to discharge unreacted oxidant out of the regenerator 20.

As illustrated in FIG. 1, the fuel cell system 1a further includes, for example, a heater 25. The heater 25 heats the inside of the regenerator 20. Heating the inside of the regenerator 20 with the heater 25 helps the water produced with the oxidation of the mediator evaporate. Since the mediator is usually nonvolatile, this operation of heating eliminates water from the regenerator 20, thereby preventing the mediator solution inside the regenerator 20 from being deficient in the mediator. Moreover, the oxidation of the mediator is accelerated because the internal temperature of the regenerator 20 is maintained within a desired range.

The heater 25 can be of any type as long as it is capable of heating the inside of the regenerator 20. The heater 25 can be, for example, an electrically powered resistance heater or a heater having a passage for a heating medium to pass through. The heater 25 has been fitted on, for example, the outer surface of the regenerator 20. For example, the heater 25 covers at least part of the outer surface of the regenerator 20. The heater 25 may surround at least part of the outer surface of the regenerator 20. The heater 25 may alternatively be inside the regenerator 20. The fuel cell system 1a may further include, for example, a stirrer (not illustrated). The stirrer in this case stirs the mediator solution inside the regenerator 20, helping maintain the temperature of the mediator solution inside the regenerator 20 spatially uniform.

The heater 25 does not need to produce heat throughout the oxidation of the mediator at the regenerator 20. The oxidation of a mediator is exothermic in many cases. The heater 25 may therefore be off while the heat produced with the oxidation of the mediator is maintaining the inside of the regenerator 20 at a temperature appropriate for the prevention of the dilution of the mediator in the mediator solution. The heater 25 produces heat in the event of a low external temperature or other circumstances that make it difficult to keep the internal temperature of the regenerator 20 within a desired range. The fuel cell system 1a may further include a temperature sensor (not illustrated). This temperature sensor, for example a thermistor-based or thermocouple-based one, detects the internal temperature of the regenerator 20. In an exemplary configuration, the heat production by the heater 25 is controlled on the basis of the temperature detected by the temperature sensor. The heater 25 can be omitted in certain cases.

The fuel cell system 1a can be modified for various purposes. For example, the fuel cell system 1a may be modified to further include a heat exchanger that exchanges heat between the oxidant flowing in the oxidant feed path 45 and gas flowing in the gas discharge path 47. The heat exchange between the oxidant flowing in the oxidant feed path 45 and gas flowing in the gas discharge path 47 heats the oxidant flowing in the oxidant feed path 45, thereby ensuring that the oxidant is supplied at an increased temperature to the regenerator 20. This helps accelerate the oxidation of the mediator. The gas flowing in the gas discharge path 47, moreover, is cooled by the heat exchange between the oxidant flowing in the oxidant feed path 45 and the gas flowing in the gas discharge path 47, ensuring safe emission of this gas from the fuel cell system 1a. In this variation there may be a thermal insulator that covers at least part of the section of the oxidant feed path 45 from the heat exchanger to the regenerator 20, or there may be a thermal insulator that covers at least part of the section of the gas discharge path 47 from the regenerator 20 to the heat exchanger. In an exemplary configuration, the fuel cell system 1a may further include, besides this heat exchanger, a heater that heats the oxidant flowing in the oxidant feed path 45. In this case the heater heats, for example, the oxidant flowing between the oxidant outlet of the heat exchanger and the outlet of the first path 21.

The gas flowing in the gas discharge path 47 contains steam. In the above variation, therefore, condensation can form at the heat exchanger. As can be understood from this, the heat exchanger can serve as a condenser. In an exemplary configuration, a water drain path is connected to the heat exchanger, and the condensation is discharged out of the heat exchanger through the water drain path. The condensation may be used for a predetermined process in the fuel cell system 1a.

Figure 2:
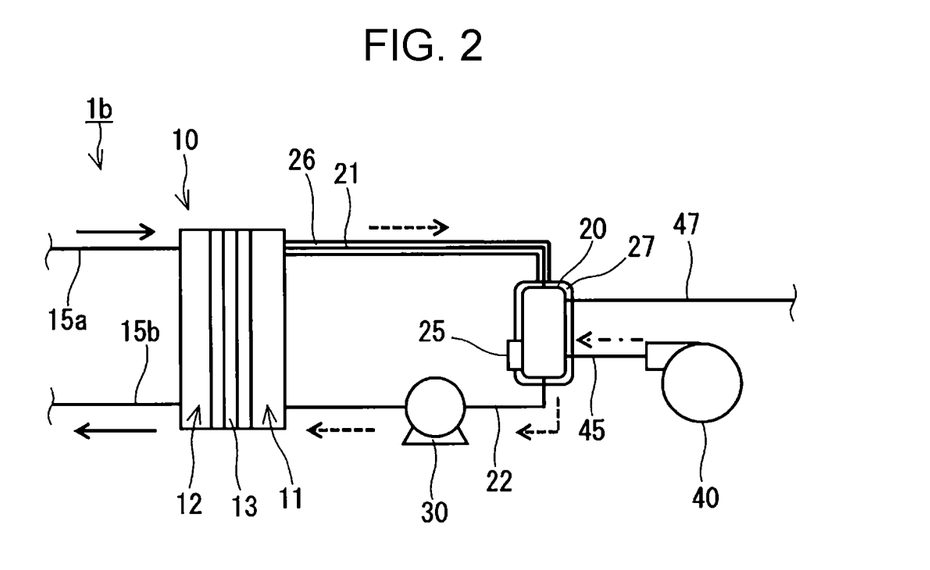
FIG. 2 illustrates another example of a fuel cell system according to the present disclosure.
Figure 3:
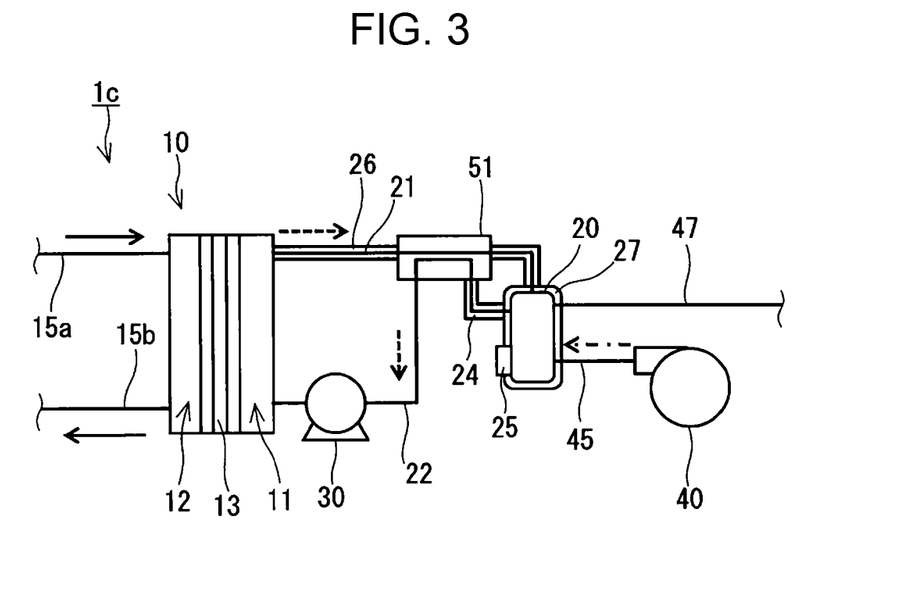
FIG. 3 illustrates yet another example of a fuel cell system according to the present disclosure.
Figure 4:
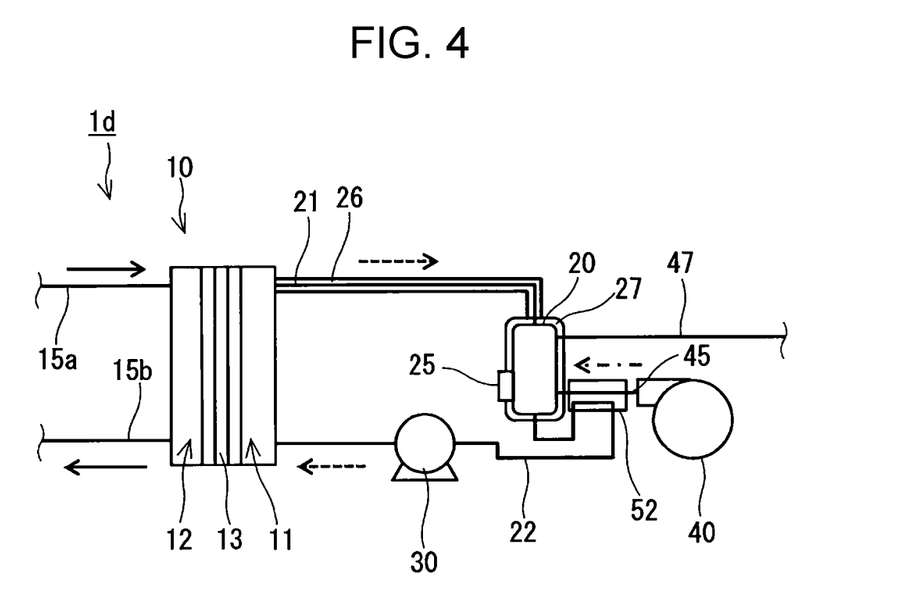
FIG. 4 illustrates yet another example of a fuel cell system according to the present disclosure.
Figure 5:
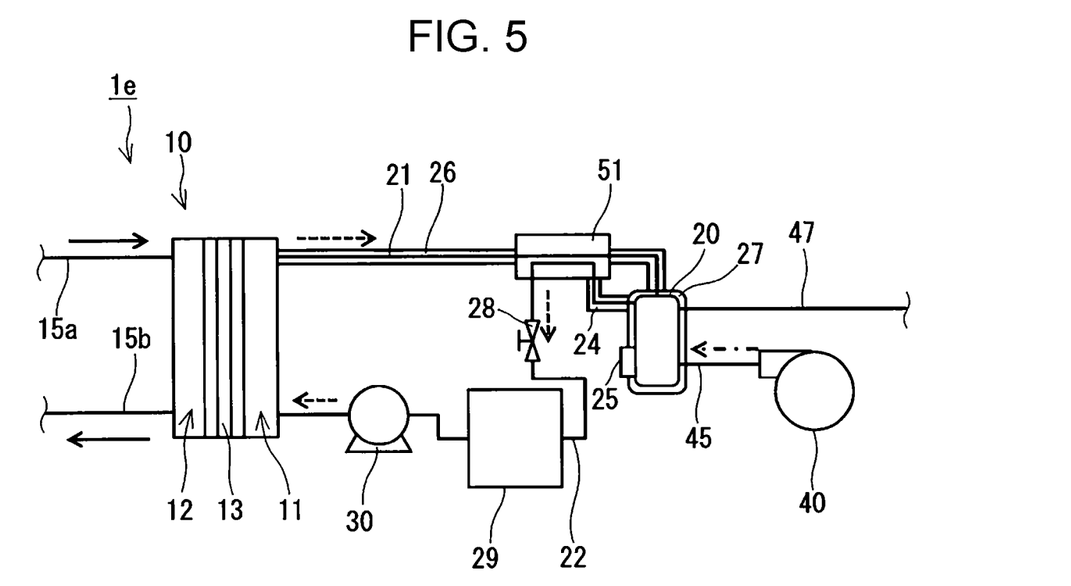
FIG. 5 illustrates yet another example of a fuel cell system according to the present disclosure.
Figure 6:
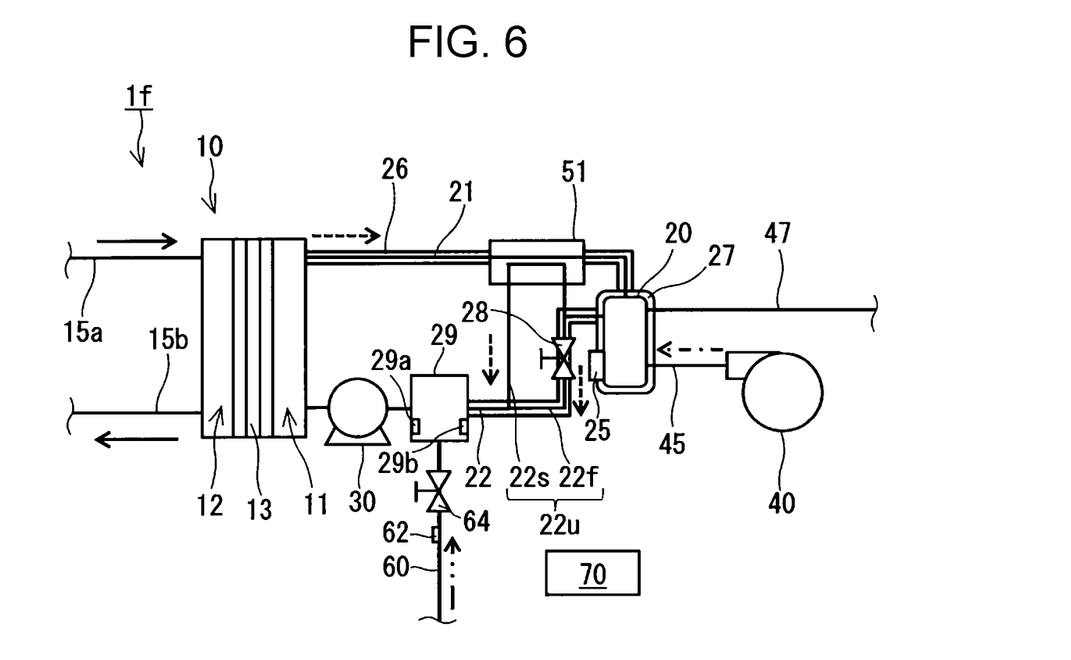
FIG. 6 illustrates yet another example of a fuel cell system according to the present disclosure.

The fuel cell system 1a may be changed as in the fuel cell system 1b illustrated in FIG. 2, the fuel cell system 1c illustrated in FIG. 3, the fuel cell system 1d illustrated in FIG. 4, the fuel cell system 1e illustrated in FIG. 5, or the fuel cell system 1f illustrated in FIG. 6. Unless otherwise specified, the structure of the fuel cell systems 1b to 1f is the same as that of the fuel cell system 1a. Any structural element of the fuel cell systems 1b to 1f that is also used in the fuel cell system 1a or corresponds to a structural element of the fuel cell system 1a is referenced by the same designator as in the fuel cell system 1a without a detailed description. A description of the fuel cell system 1a is also true for the fuel cell systems 1b to 1f unless technically contradictory.

As illustrated in FIG. 2, the fuel cell system 1b further includes a first thermal insulator 26. The first thermal insulator 26 covers at least part of the first path 21. A hollow material that provides an air space can also be used as the first thermal insulator 26. The first thermal insulator 26 prevents the mediator-containing solution from cooling in the first path 21. This helps maintain the internal temperature of the regenerator 20 at a desired temperature, thereby helping accelerate the oxidation of the mediator. Moreover, the first thermal insulator 26 reduces the external supply of energy required to maintain the inside of the regenerator 20 at a desired temperature, thereby helping improve the efficiency of the fuel cell system 1b. The first thermal insulator 26 may cover the entire first path 21. Here, the forms of covering contemplated by the verb "cover" can include thermal insulation achieved by putting the thermal insulator 26 directly on the component(s) that forms the first path 21 and covering the first path 21 with the thermal insulator 26 with a space or a certain material interposed therebetween.

As illustrated in FIG. 2, the fuel cell system 1b further includes, for example, a second thermal insulator 27. The second thermal insulator 27 covers at least part of the regenerator 20. A hollow material that provides an air space can also be used as the second thermal insulator 27. The second thermal insulator 27 helps maintain the inside of the regenerator 20 at a desired temperature. Moreover, the second thermal insulator 27 reduces the external supply of energy required to maintain the inside of the regenerator 20 at a desired temperature, thereby helping improve the efficiency of the fuel cell system 1b. The second thermal insulator 27 may cover the entire regenerator 20. Here, the forms of covering contemplated by the verb "cover" can include thermal insulation achieved by putting the thermal insulator 27 directly on the regenerator 20 and covering the regenerator 20 with the thermal insulator 27 with a space or a certain material interposed therebetween.

The thermal insulators 26 and 27 can be made of any material. Examples of materials for the thermal insulators 26 and 27 include resin, metal, glass, and a ceramic material. The form of the thermal insulators 26 and 27 is not critical either. The thermal insulators 26 and 27 can be, for example, pieces of foam or masses of fiber.

As illustrated in FIG. 3, the fuel cell system 1c further includes a first heat exchanger 51. The first heat exchanger 51 exchanges heat between a first fluid, which is a fluid flowing in the first path 21 and containing the mediator, and a second fluid, which is a fluid flowing in the second path 22 and containing the mediator. The second fluid, flowing in the second path 22 and containing the mediator, is typically hotter than the first fluid, flowing in the first path 21 and containing the mediator, because of the heat produced with the oxidation of the mediator at the regenerator 20. The heat exchange between the first and second fluids at the first heat exchanger 51 therefore cools the second fluid. This helps the mediator to be supplied at a lowered temperature to the cathode 11, thereby helping extend the service life of the fuel cell 10. The first fluid, moreover, is heated by the heat exchange between the first and second fluids at the first heat exchanger 51, helping the mediator-containing solution to be supplied at an increased temperature to the regenerator 20. This helps maintain the internal temperature of the regenerator 20 at a desired temperature, thereby helping accelerate the oxidation of the mediator.

The fuel cell system 1c further includes, for example, a thermal insulator 24. The thermal insulator 24 covers the second path 22 between the regenerator 20 and the second-fluid inlet of the first heat exchanger 51, thereby keeping the second fluid hot while it is supplied to the first heat exchanger 51. The second fluid supplied to the first heat exchanger 51 is therefore hotter than the first fluid supplied to the first heat exchanger 51, helping achieve a large difference in temperature between the first and second fluids at the first heat exchanger 51. This makes the heat exchange between the first and second fluids at the first heat exchanger 51 more efficient. After passing through the first heat exchanger 51, the second fluid is further cooled in the second path 22 between the second-fluid outlet of the first heat exchanger 51 and the cathode 11. The mediator is therefore supplied in an appropriately cooled state to the cathode 11. In an exemplary configuration, the second path 22 between the second-fluid inlet of the first heat exchanger 51 and the regenerator 20 is shorter than the second path 22 between the second-fluid outlet of the first heat exchanger 51 and the cathode 11. This ensures a larger difference in temperature between the first and second fluids at the first heat exchanger 51 and appropriate cooling of the mediator in the second path 22 between the second-fluid outlet of the first heat exchanger 51 and the cathode 11. Here, the forms of covering contemplated by the verb "cover" can include thermal insulation achieved by putting the thermal insulator 24 directly on the component(s) that forms the second path 22 and covering the second path 22 with the thermal insulator 24 with a space or a certain material interposed therebetween.

The first heat exchanger 51 can be of any type as long as it is capable of exchanging heat between the first and second fluids. The first heat exchanger 51 has, for example, at least one of features (i) to (iii) listed below. The first heat exchanger 51 can be, for example, a plate heat exchanger, a double-pipe heat exchanger, or a shell-and-tube heat exchanger.

(i) The second path 22 is positioned near the first path 21.
(ii) The component(s) forming the second path 22 is in contact with the component(s) forming the first path 21.
(iii) The first and second paths 21 and 22 are separated by a material suitable for the purpose of heat exchange.

The fuel cell system 1c includes, for example, a first thermal insulator 26 and a second thermal insulator 27. At least one of the first and second thermal insulators 26 and 27 may be omitted, for example if the first fluid is sufficiently heated by the heat exchange between the first and second fluids at the first heat exchanger 51.

As illustrated in FIG. 4, the fuel cell system 1d further includes a second heat exchanger 52. The second heat exchanger 52 exchanges heat between the oxidant in the oxidant feed path 45 and the second fluid, flowing in the second path 22 and containing the mediator. Typically, the oxidant (e.g., air) supplied to the regenerator 20 through the oxidant feed path 45 is colder than the second fluid, flowing in the second path 22 and containing the mediator. The heat exchange between the oxidant and the second fluid at the second heat exchanger 52 therefore cools the second fluid. This helps the mediator supplied to the cathode 11 to cool down, thereby helping extend the service life of the fuel cell 10. The oxidant, moreover, is heated by the heat exchange between the oxidant and the second fluid at the second heat exchanger 52, helping the oxidant to be supplied at an increased temperature to the regenerator 20. This helps maintain the internal temperature of the regenerator 20 at a desired temperature, thereby helping accelerate the oxidation of the mediator.

The second heat exchanger 52 can be of any type as long as it is capable of exchanging heat between the oxidant and the second fluid. The second heat exchanger 52 has, for example, at least one of features (I) to (III) listed below. The second heat exchanger 52 can be, for example, a plate heat exchanger or a fin-tube heat exchanger.

(I) The second path 22 is positioned near the oxidant feed path 45.

(II) The component(s) forming the second path 22 is in contact with the component(s) forming the oxidant feed path 45.

(III) The second path 22 and the oxidant feed path 45 are separated by a material suitable for the purpose of heat exchange.

As illustrated in FIG. 5, the fuel cell system 1e further includes a tank 29. The tank 29 is in the second path 22 and retains the mediator oxidized at the regenerator 20. This helps make the regenerator 20 smaller in size. Moreover, by reducing the external supply of energy required to maintain the inside of the regenerator 20 at a desired temperature, the tank 29 helps improve the efficiency of the fuel cell system 1e. The tank 29 is located, for example, in the second path 22 between the regenerator 20 and the pump 30. The tank 29 may be in the second path 22 between the pump 30 and the cathode 11.

The fuel cell system 1e further includes, for example, a valve 28. The valve 28 is located, for example, in the second path 22. The valve 28 is located, for example, in the second path 22 between the regenerator 20 and the tank 29. The valve 28 can be, to name a few, an on-off valve, such as a solenoid valve, or a flow regulator valve, such as a motor valve. By controlling the valve 28, the flow of the mediator-containing solution in the second path 22 can be regulated.

In the fuel cell system 1e, at least one of the first and second thermal insulators 26 and 27 may be omitted, for example if the first fluid is sufficiently heated by the heat exchange between the first and second fluids at the first heat exchanger 51. Moreover, in the fuel cell system 1e, the first heat exchanger 51 may be omitted, for example if the regenerator 20 is sufficiently small.

The fuel cell system 1f illustrated in FIG. 6 has the same structure as the fuel cell system 1e unless otherwise specified. The fuel cell system 1f further includes a liquid delivery path 60 and a controller 70. The liquid delivery path 60 is connected to the tank 29 and is used to supply a liquid for diluting the mediator to the tank 29. An example of a liquid for diluting the mediator is water. The controller 70 regulates the flow rate of the liquid in the liquid delivery path 60.

For stable operation of the fuel cell system 1f, it is desirable to keep the mediator concentration of the mediator solution to be supplied to the cathode 11 within a predetermined range. As mentioned above, the internal temperature of the regenerator 20 is maintained high in order that part of the solvent in the mediator solution evaporate to prevent the mediator solution in the regenerator 20 from being deficient in the mediator. This means, upon discharge from the regenerator 20, the mediator solution may be too rich in the mediator. In the fuel cell system 1f, the concentration of the mediator can be controlled to a desired range because at the tank 29, the mediator can be diluted with the liquid supplied through the liquid delivery path 60 to the tank 29.

The fuel cell system 1f further includes, for example, a valve 64. The valve 64 is located, for example, in the liquid delivery path 60. The valve 64 can be, to name a few, an on-off valve, such as a solenoid valve, or a flow regulator valve, such as a motor valve. By controlling the valve 64, the controller 70 regulates the flow rate of the liquid in the liquid delivery path 60. In an exemplary configuration, the controller 70 is a digital computer on which a predetermined program has been installed operably, and the controller 70 and the valve 64 are wired or wirelessly linked together so that the valve 64 can receive control signals sent from the controller 70.

The fuel cell system 1f further includes, for example, a sensor 29a. The sensor 29a detects at least one selected from the group consisting of the pH, electrostatic potential, and mediator concentration of the mediator solution retained in the tank 29. In an exemplary configuration, the sensor 29a is wired or wirelessly linked to the controller 70, so that the controller 70 can acquire information that indicates values detected by the sensor 29a. On the basis of the information indicating values detected by the sensor 29a, the controller 70 determines the volume of liquid to be supplied to the tank 29. The controller 70 also generates, on the basis of the determined volume, control signals for controlling the valve 64 and sends them to the valve 64.

The liquid flowing in the liquid delivery path 60 can be of any kind as long as the mediator can be diluted with it. An example of a liquid flowing in the liquid delivery path 60 is water. The liquid flowing in the liquid delivery path 60 can come from any source. For example, condensation obtained by condensing steam flowing in the gas discharge path 47 may be supplied through the liquid delivery path 60 to the tank 29. This enables effective use of condensation for the purpose of diluting the mediator.

In the fuel cell system 1f, the second path 22 includes, for example, an upstream path 22u. The upstream path 22u connects the regenerator 20 and the tank 29 together. The upstream path 22u has a first portion 22f and a second portion 22s. The first portion 22f extends from the regenerator 20 to the tank 29. The second portion 22s allows the mediator to cool down while bypassing at least part of the first portion 22f. The controller 70 regulates, for example, the flow rate of the mediator in the first portion 22f and that in the second portion 22s.

By adjusting the flow rate of the mediator in the first portion 22f and that in the second portion 22s, the release of heat from the mediator solution in the upstream path 22u, and therefore the temperature of the temperature of the mediator solution supplied to the tank 29, can be controlled. For example, allowing the mediator to flow faster in the first portion 22f than in the second portion 22s helps the mediator solution to be supplied at an increased temperature to the tank 29, compared with the opposite. In certain cases, for example, the liquid supplied through the liquid delivery path 60 to the tank 29 may be colder than a desired temperature. In the fuel cell system 1f, the temperature of the mediator solution supplied to the tank 29 can be controlled in accordance with the temperature of the liquid supplied through the liquid delivery path 60 to the tank 29. As a result, the temperature of the mediator solution retained in the tank 29 can be controlled to a desired range.

As illustrated in FIG. 6, the second portion 22s extends, for example, to bypass part of the first portion 22f. In an exemplary configuration, part of the second portion 22s is located in the first heat exchanger 51. In this case the heat exchange between the mediator solution in the second portion 22s and that in the first path 21 cools the mediator in the second portion 22s. In the fuel cell system 1f, the first heat exchanger 51 is optional.

As illustrated in FIG. 6, at least part of the first portion 22f may be covered with a thermal insulator. This ensures the mediator solution flowing in the first portion 22f is kept warm. Since the mediator solution is kept warm in the first portion 22f and cooled in the second portion 22s, the temperature of the mediator solution supplied to the tank 29 can be controlled over a wide range. Covering the first portion 22f with a thermal insulator is optional.

The fuel cell system 1f further includes, for example, temperature sensors 29b and 62. The temperature sensor 29b detects the temperature of the mediator solution in the tank 29. The temperature sensor 29b is located, for example, inside the tank 29. The temperature sensor 62 detects the temperature of the liquid for diluting the mediator. The temperature sensor 62 is located, for example, in the liquid delivery path 60. The temperature sensor 62 may be in a tank (not illustrated) that retains the liquid for diluting the mediator. Each of the temperature sensors 29b and 62 is wired or wirelessly linked to the controller 70, so that the controller 70 can acquire information that indicates temperatures detected by the temperature sensors 29b and 62. This allows the controller 70 to regulate the flow rate of the mediator in the first portion 22f and that in the second portion 22s on the basis of temperatures detected by the temperature sensors 29b and 62. In an exemplary configuration, the controller 70 regulates the flow rate of the mediator in the first portion 22f and that in the second portion 22s by controlling a valve 28.

In the fuel cell system 1f, the valve 28 is located, for example, in the first portion 22f. The valve 28 may be in the second portion 22s. Alternatively, the valve 28 may connect the first and second portions 22f and 22s together. The valve 28 in this case can be a three-way valve.

In the fuel cell system 1f, at least part of the tank 29 may be covered with a thermal insulator. Covering the tank 29 with a thermal insulator is optional. For example, the tank 29 does not need to be covered with a thermal insulator if the second path 22 between the tank 29 and the cathode 11 is short. Alternatively, the tank 29 does not need to be covered with a thermal insulator if the operation of the controller 70 considers the release of heat from the second path 22 between the tank 29 and the cathode 11.

Figure 7:
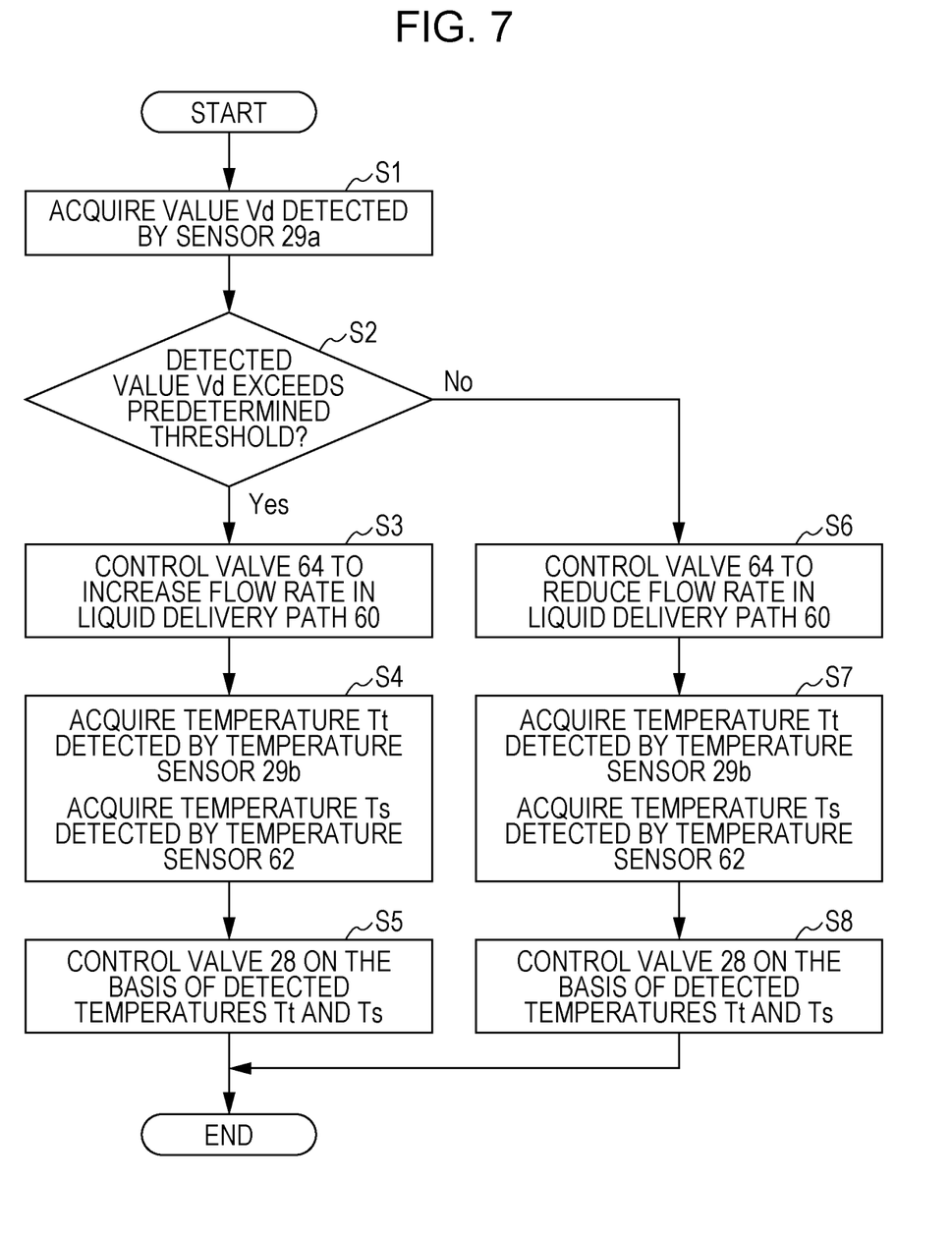
FIG. 7 is a flowchart representing a procedure executed in the fuel cell system illustrated in FIG. 6.

The following gives an example of how in the fuel cell system 1f the mediator concentration and temperature of the mediator solution in the tank 29 are regulated. In an exemplary configuration, the procedure illustrated in FIG. 7 is executed regularly while the fuel cell system 1f is operating. In step S1, the controller 70 acquires a value Vd detected by the sensor 29a. In step S2, the controller 70 determines whether or not the detected value Vd exceeds a predetermined threshold. This predetermined threshold corresponds to the highest concentration of the mediator in the mediator solution suitable for supply to the cathode 11. If the result in step S2 is positive, the procedure goes to step S3, in which the controller 70 controls the valve 64 to increase the flow rate of the liquid in the liquid delivery path 60. For example, the controller 70 increases the opening of the valve 64. The procedure then goes to step S4, in which the controller 70 acquires temperatures Tt and Ts detected by the temperature sensors 29b and 62. The procedure then goes to step S5, in which the controller 70 controls the valve 28 on the basis of the detected temperatures Tt and Ts. For example, the controller 70 adjusts the opening of the valve 28 to bring the detected temperature Tt closer to a target temperature. After step S5, a set of operations ends.

If the result in step S2 is negative, the procedure goes to step S6, in which the controller 70 controls the valve 64 to reduce the flow rate of the liquid in the liquid delivery path 60. For example, the controller 70 reduces the opening of the valve 64. The procedure then goes to step S7, in which the controller 70 acquires temperatures Tt and Ts detected by the temperature sensors 29b and 62. The procedure then goes to step S8, in which the controller 70 controls the valve 28 on the basis of the detected temperatures Tt and Ts. For example, the controller 70 adjusts the opening of the valve 28 to bring the detected temperature Tt closer to a target temperature. After this, a set of operations ends.

The structural elements of the fuel cell systems 1a to 1f can be used in combination unless technically contradictory.

What is claimed is:

1. A fuel cell system comprising:
   a fuel cell that includes an anode and a cathode and generates electricity by reducing a mediator at the cathode;
   a regenerator that oxidizes the mediator reduced by the cathode;
   a first path that leads from the cathode to the regenerator and through which the mediator reduced by and discharged from the cathode is guided to the regenerator;
   a second path that leads from the regenerator to the cathode and through which the mediator oxidized at the regenerator is returned to the cathode; and
   a first heat exchanger that exchanges heat between a first fluid and a second fluid, the first fluid being a fluid flowing in the first path and containing the mediator reduced by cathode, and the second fluid being a fluid flowing in the second path and containing the mediator oxidized at the regenerator.

2. The fuel cell system according to claim 1, wherein the second path releases more heat per second than the first path does.

3. The fuel cell system according to claim 1, wherein at least part of the second path is made of a material that has a higher thermal conductivity than a material forming the first path.

4. The fuel cell system according to claim 1, further comprising a thermal insulator that covers at least part of the first path.

5. The fuel cell system according to claim 1, further comprising:
   an oxidant feed path through which an oxidant is supplied to the regenerator; and
   a second heat exchanger that exchanges heat between the oxidant in the oxidant feed path and the second fluid.

6. The fuel cell system according to claim 1, further comprising a tank that is disposed in the second path and retains the mediator oxidized at the regenerator.

7. The fuel cell system according to claim 6, further comprising:
   a liquid delivery path that is connected to the tank and through which a liquid for diluting the mediator is supplied to the tank; and
   a controller that regulates a flow rate of the liquid in the liquid delivery path.

8. The fuel cell system according to claim 7, wherein:
   the second path includes an upstream path that connects the regenerator and the tank;

the upstream path has a first portion that extends from the regenerator to the tank and a second portion that allows the mediator to cool down while bypassing at least part of the first portion; and the controller regulates a flow rate of the mediator in the first portion and a flow rate of the mediator in the second portion.

9. The fuel cell system according to claim 1, further comprising a thermal insulator that covers at least part of the regenerator.

10. The fuel cell system according to claim 1, further comprising a heater that heats an inside of the regenerator.

* * * * *